(12) United States Patent
Willis (10) Patent No.: US 10,422,910 B2
(45) Date of Patent: Sep. 24, 2019

(54) SYSTEMS AND METHODS FOR CORRECTING OFF-CENTER ACOUSTIC SONDES

(71) Applicant: Halliburton Energy Services, Inc., Houston, TX (US)

(72) Inventor: Mark Elliott Willis, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 431 days.

(21) Appl. No.: 15/303,150

(22) PCT Filed: Jan. 20, 2016

(86) PCT No.: PCT/US2015/060153
§ 371 (c)(1),
(2) Date: Oct. 10, 2016

(87) PCT Pub. No.: WO2017/127041
PCT Pub. Date: Jul. 27, 2017

(65) Prior Publication Data
US 2018/0038979 A1 Feb. 8, 2018

(51) Int. Cl.
*G01V 13/00* (2006.01)
*G01V 1/48* (2006.01)
*E21B 28/00* (2006.01)

(52) U.S. Cl.
CPC .............. *G01V 1/48* (2013.01); *E21B 28/00* (2013.01); *G01V 13/00* (2013.01); *G01V 2200/14* (2013.01); *G01V 2210/54* (2013.01); *G01V 2210/6222* (2013.01)

(58) Field of Classification Search
None
See application file for complete search history.

(56) References Cited

U.S. PATENT DOCUMENTS

| 4,829,486 | A | * | 5/1989 | Broding | E21B 47/0002 |
| | | | | | 181/105 |
| 5,469,736 | A | * | 11/1995 | Moake | E21B 47/082 |
| | | | | | 166/254.2 |
| 5,638,337 | A | * | 6/1997 | Priest | G01V 1/50 |
| | | | | | 367/27 |
| 5,987,385 | A | * | 11/1999 | Varsamis | E21B 47/0002 |
| | | | | | 702/6 |
| 6,065,219 | A | * | 5/2000 | Murphey | E21B 44/00 |
| | | | | | 33/302 |
| 6,366,531 | B1 | * | 4/2002 | Varsamis | G01V 1/44 |
| | | | | | 181/102 |

(Continued)

OTHER PUBLICATIONS

International Search Report and Written Opinion issued in corresponding PCT application No. PCT/US2015/060153 dated Aug. 10, 2016, 17 pgs.

Primary Examiner — Hovhannes Baghdasaryan
(74) Attorney, Agent, or Firm — Chamberlain Hrdicka (57) ABSTRACT

A method of performing acoustic logging comprises generating a first acoustic signal from a first source at a first time, wherein the first source is a first distance away from a wellbore wall, and generating a second acoustic signal from a second source at a second time, wherein the second source is a second distance away from the wellbore wall. The difference between the first time and the second time depends on a calibration value.

23 Claims, 7 Drawing Sheets

(56) References Cited

U.S. PATENT DOCUMENTS

| | | | |
|---|---|---|---|
| 6,891,777 B2* | 5/2005 | Pabon | E21B 47/082 181/105 |
| 2006/0198242 A1* | 9/2006 | Geerits | G01V 1/46 367/25 |
| 2013/0064039 A1 | 3/2013 | Pabon | |
| 2015/0211352 A1 | 7/2015 | Sugiura | |
| 2015/0285058 A1 | 10/2015 | Gao et al. | |

* cited by examiner

SYSTEMS AND METHODS FOR CORRECTING OFF-CENTER ACOUSTIC SONDES

BACKGROUND

This section is intended to provide background information to facilitate a better understanding of the various aspects of the described embodiments. Accordingly, it should be understood that these statements are to be read in this light and not as admissions of prior art.

Acoustic logging operations are used to collect data regarding the formation around a wellbore. Typically, an acoustic logging tool such as an acoustic sonde is lowered into the wellbore via wireline and emits an acoustic signal in multiple directions at the surrounding wellbore wall or formation. The acoustic signal travels through the formation and returns to the logging tool having been altered by the formation. As different characteristics of the formation alter the signal differently, the returning signal carries data regarding such characteristics of the formation. Thus, by analyzing the returning signal, the formation characteristics can be obtained. In most acoustic logging operations, it is advantageous for the logging tool to be in the center of the wellbore, as this propagates a symmetric waveform towards the wellbore. However, in the field, it may be difficult to keep the logging tool in the center of the well bore for various reasons (e.g., the wireline may move, the wellbore may not be straight, etc.). This causes the waveform generated by the logging tool to lose its symmetry.

BRIEF DESCRIPTION OF THE DRAWINGS

Illustrative embodiments of the present disclosure are described in detail below with reference to the attached drawing figures, which are incorporated by reference herein and wherein.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

The present disclosure is directed towards correcting borehole measurements made by an off-center acoustic sonde, thereby simulating a centered acoustic sonde. In some embodiments, the correction is made by introducing a time delay between the firing of sources when the sources are not equidistant from the wellbore wall. Thus, the waves generated by the sources still reach the wellbore wall at substantially the same time.

Figure 1:
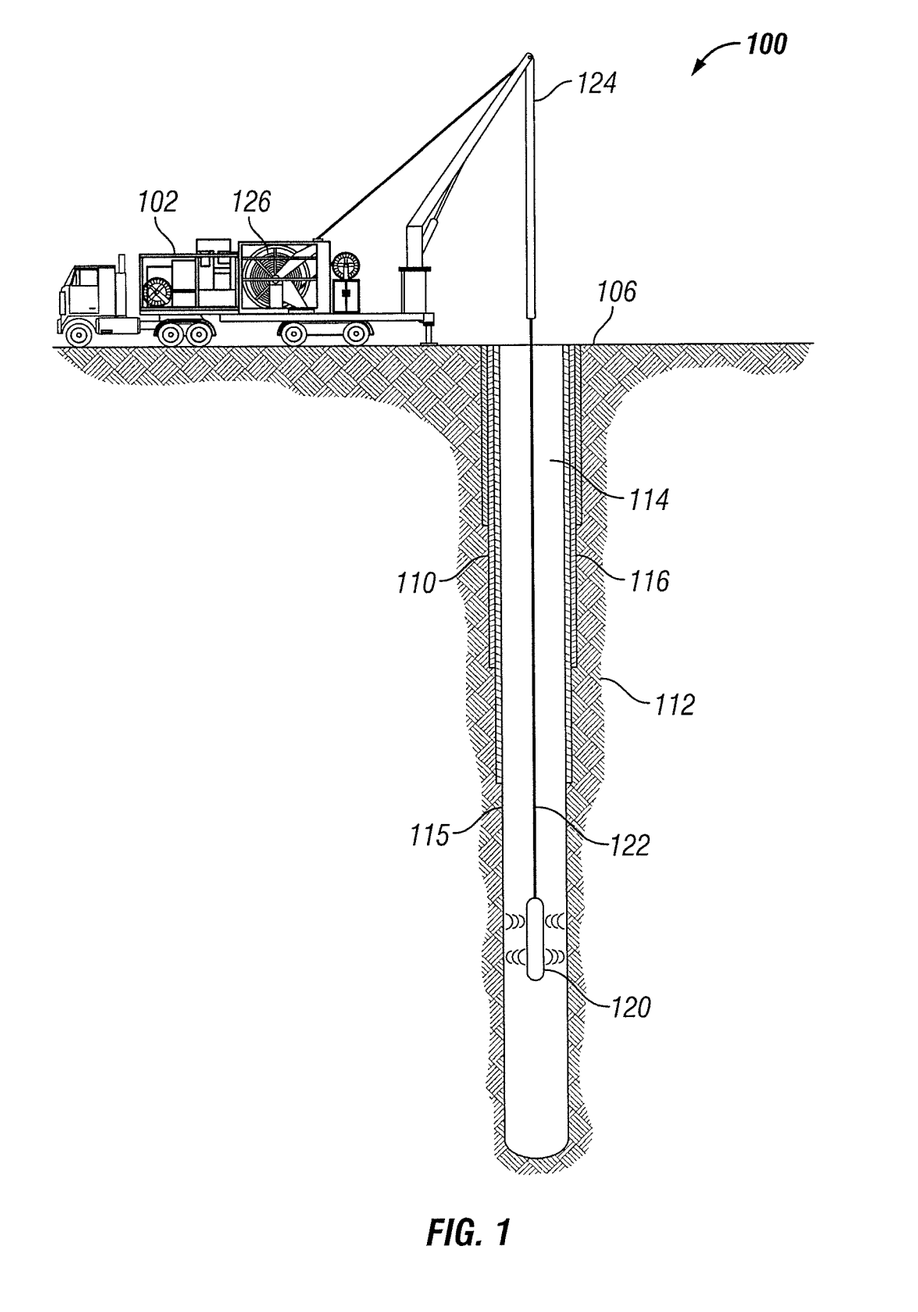
FIG. 1 illustrates a simplified illustration of an acoustic logging operation, in accordance with example embodiments of the present disclosure.

Referring to the drawings, FIG. 1 illustrates a simplified illustration of an acoustic logging operation 100, in accordance with example embodiments of the present disclosure. An acoustic logging operation 100 is conducted to obtain certain characteristics of a well 114. The well 114 is formed from a surface well site 106 through one or more formations 112. The well 114 may include a wellbore 115 which is at least partially defined by a casing string 110. Lower parts of the wellbore 115 may be left uncased and described as "open hole". In certain example embodiments, production fluids may enter the well 114 from the surrounding formations 112.

In some embodiments, the acoustic logging operating 100 may be a wireline operation, in which an acoustic sonde 120 is lowered into the well 114 via a wireline 122. In some embodiments, the wireline 122 is suspended from a wireline truck 102 parked at the well site 106. The wireline truck 102 may include a wireline spool 126 which supplies the wireline. The wireline truck 102 may also include a hoist 124 which suspends the wireline 122 and acoustic sonde 120 in the well 114. In some embodiments, the wireline 122 may be suspended by various other well site structures such as a rig.

In some embodiments, the acoustic sonde 120 is configured to emit acoustic signals 130 to the wellbore wall 115 and through the formation 112 and detect the returning acoustic data signal 132. The returning acoustic data signal 132 is altered from the original acoustic signal 130 based on the structure and characteristics of the formation, such as rock velocity, porosity, fluid saturation, fluid type, among others. Thus, the acoustic data signal 132 carries such data and can be filtered and/or processed to obtain the formation data.

Figure 2:
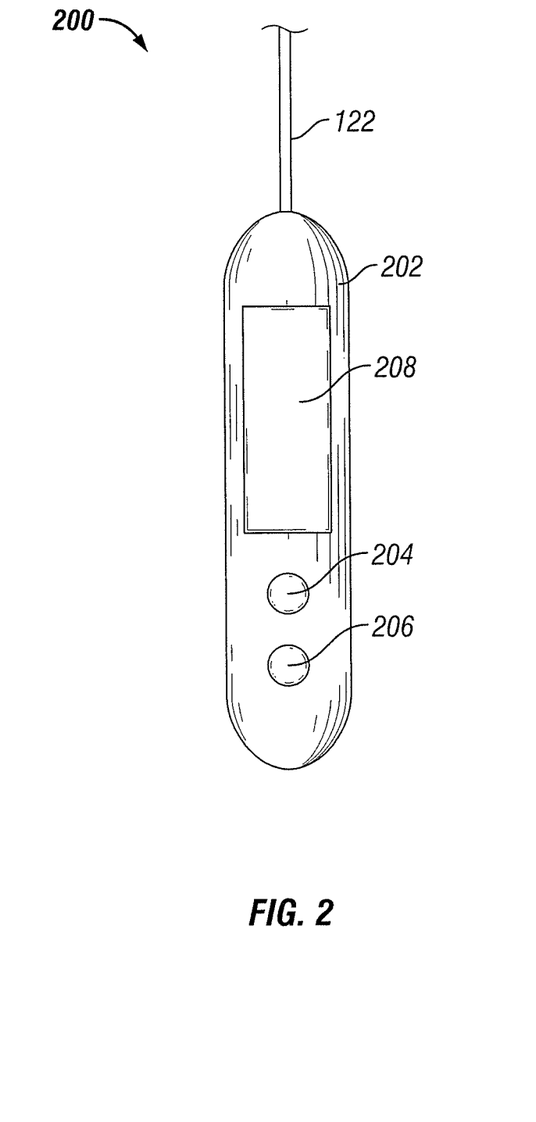
FIG. 2 illustrates a simplified representational illustration of an acoustic sonde, in accordance with example embodiments of the present disclosure.

FIG. 2 illustrates a simplified representational illustration of an acoustic sonde 200, in accordance with example embodiments of the present disclosure. In some example embodiments, the acoustic sonde 200 includes a tool body 202 which comprises an acoustic source 204, a detector 206, and electronics 208. The acoustic source 204 is configured to generate and propagate an acoustic signal (i.e., wave) from the acoustic sonde 200. In some application, the acoustic signal generated from by the source 204 travels to and/or through the borehole wall 116 and the surrounding formation 112. In some embodiments, the source 204 includes a piezoelectric crystal. The detector 206 is configured to receive an acoustic data signal from the formation 112. In some example embodiments, the acoustic sonde 200 may include one or more sets of sources 204 and detectors 206. In some embodiments, corresponding sources 204 and detectors 206 can be disposed next to each other in various orientations. In some embodiments, corresponding sources 204 and detectors 206 can be collocated. In some embodiments, the source 204 can also function as the detector 206.

In some embodiments, the electronics 208 of the acoustic sonde 200 include various electronic components used to enable the functions of the acoustic sonde 200, which may include one or more processors and/or controllers. For example, the electronics 208 may include a controller configured to control the acoustic signal generated by the source 204. Specifically, the controller may control the firing time of the acoustic signal, and the wave parameters (e.g., amplitude, frequency, etc.) of the signal. In some embodiments, the processor receives a data input from the detector 206 based on the received acoustic data signal from the formation 112. In some embodiments, the processor can perform some signal processing on the raw data received from the detector 206 to refine the data or put the data in a different format ready or analysis or further processing. In some embodiments, the processor relays the raw data collected from the detector 206 directly up-hole to a surface facility for further processing and/or analysis. The acoustic sonde 200 may receive control data from a surface facility via the wireline 122 and transmit data to a surface facility via the wireline 122.

Figure 3:
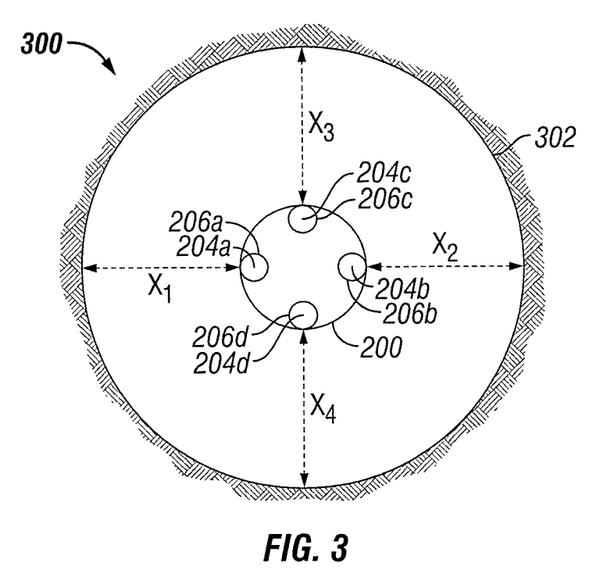
FIG. 3 illustrates a cross-sectional illustration of an acoustic sonde centered within a borehole, in accordance with example embodiments of the present disclosure.

FIG. 3 illustrates a cross-sectional illustration 300 of a centered acoustic sonde 200 within a wellbore 302. In some embodiments, the acoustic sonde 200 includes four sources (204a, 204b, 204c, 204d) and detectors (206a, 206b, 206c, 206d), which are paired respectively. In the application of FIG. 3, the acoustic sonde 200 is substantially centered within the borehole such that the distance between each source 204 and the wellbore are substantially the same ($x_1=x_2=x_3=x_4$). "Substantially" refers to the inclusion of a degree of error that is below a certain threshold and/or which is considered negligible of purposes of the application.

When the acoustic sonde 200 is substantially centered in the borehole, each of the sources 204 can be fired at the same time and a symmetric waveform propagates towards the wellbore 302 from the acoustic sonde 200, which in certain applications creates the ideal condition for collecting the acoustic data from the wellbore 302 and adjacent formation 112.

Figure 4:
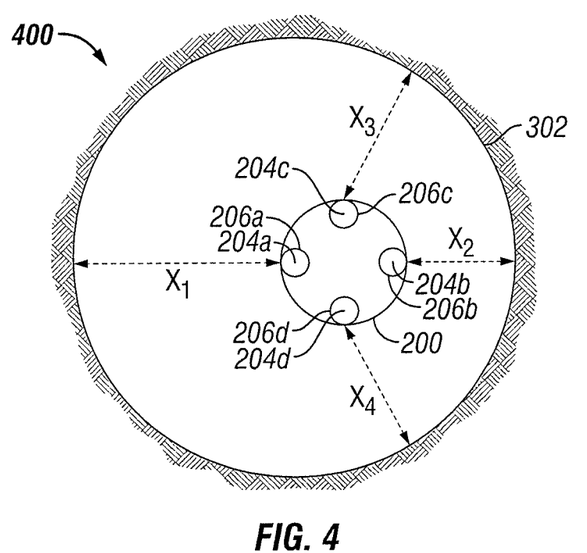
FIG. 4 illustrates a cross-sectional illustration of an acoustic sonde off-centered within a borehole, in accordance with example embodiments of the present disclosure.

FIG. 4 illustrates a cross-sectional illustration 400 of an off-centered acoustic sonde 200 within the borehole 302. The acoustic sonde 200 is disposed off-center such that the distance between at least two of the source 204 and the wellbore 302 are different (e.g., $x_1 \neq x_2$, $x_1 \neq x_3$, etc.). Thus, if the sources 204 are fired simultaneously, the respective signals may reach the wellbore 302 at different times, introducing asymmetry to the acoustic pulse generated by the acoustic sonde 200. Thus, according to certain embodiments of the present disclosure, in order to mitigate the asymmetry and simulate a centered acoustic sonde 200, the sources 204 of an off-centered tool are fired at different times to compensate for the different distances. As such, the signals from the sources 204 reach the wellbore 302 at substantially the same time. For example, source 204a may be fired first since it is furthest from the wellbore, source 204c and source 204d may be fired after the first source 204a, and source 204b may be fired last since it is closest to the wellbore 302.

When the acoustic sonde 200 is deployed down-hole, it may be difficult to know exactly where the sonde 200 is relative to the wellbore 302 and how off-center it is. Thus, in some embodiments, in order to calculate the time delays between the firings of the sources 204, all of the sources 204 are initially fired at the same time. Then the time at which the detectors 206 receive the respective data signals (i.e., the time it takes the acoustic signal to travel to and from the wellbore) is used to determine the appropriate time delays between the firing of each source 204, and a timing scheme is generated. Such a process can be considered calibration. Calibration can be performed at the beginning of the operation, throughout the operation, intermittently, or upon the detection of certain conditions, or anything combination thereof. In some embodiments, it may be determined that the acoustic sonde 200 is indeed centered and there are no time delays. In some example embodiments, the amplitude of the waveforms generated by the sources 204 may be adjusted accordingly as well such that the waveform generated by a source further away from the wellbore 302 has a greater amplitude.

In some embodiments, the location of the acoustic sonde or appropriate time delays are already known. This may be due to previously performed calibration or known parameters. Thus, such embodiments of the present disclosure include operating the acoustic sonde according to the predetermined timing scheme, which includes firing the sources with predetermined time delays therebetween.

Although FIGS. 3 and 4 illustrate an example sonde 200 having four acoustic sources 204, other embodiments of the present disclosure can include sondes having any number of acoustic sources 204, including any number of pairs of sources 204.

Figure 5:
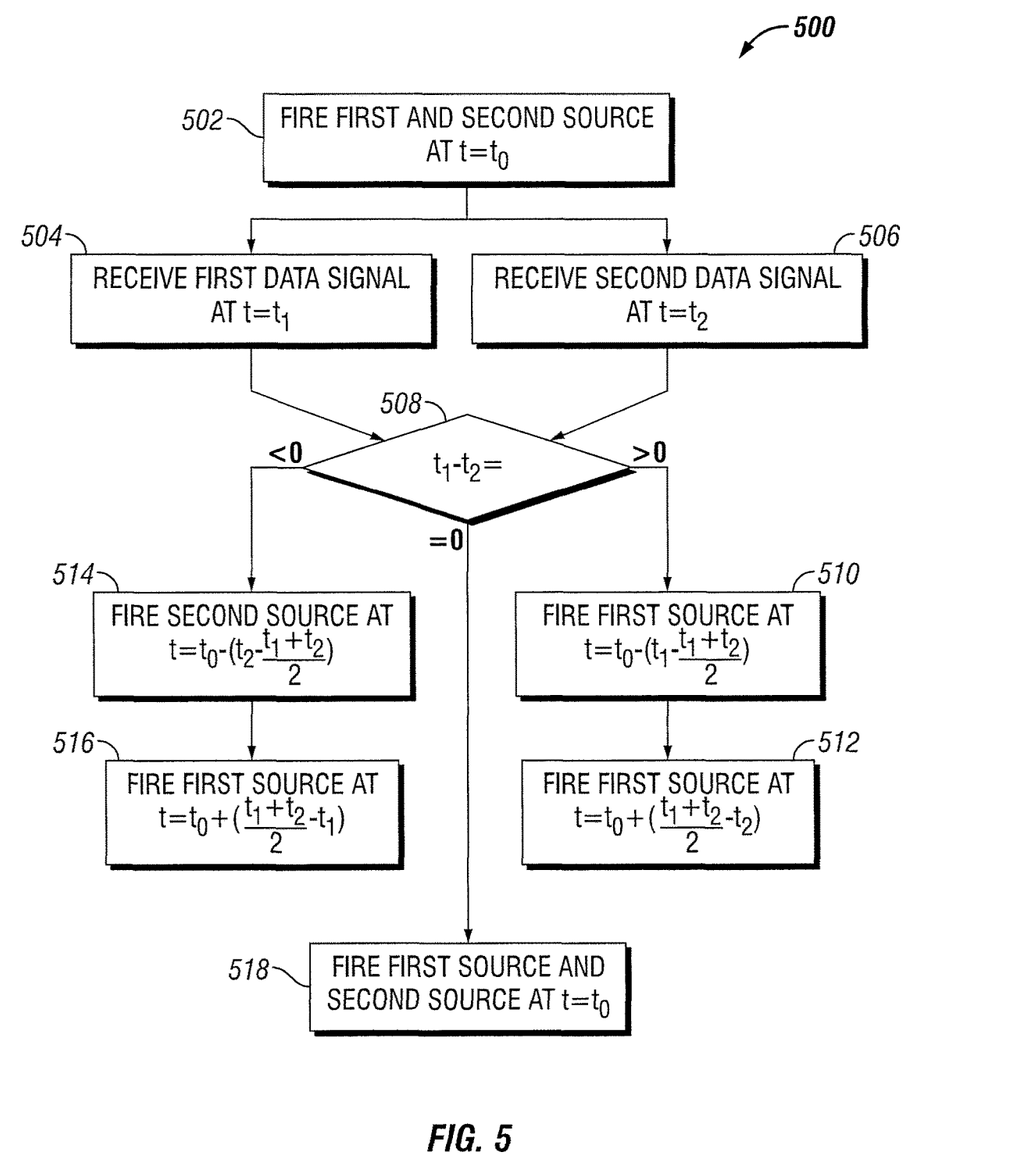
FIG. 5 illustrates a method of performing an acoustic logging operation, in accordance with example embodiments of the present disclosure.

FIG. 5 illustrates a method 500 of performing an acoustic logging operation, in accordance with example embodiments of the present disclosure. The method 500 includes firing a first source and a second source simultaneously at an initial time, $t_0$ (block 502). Then a first data signal is received by the first detector at a first time, $t_1$ (block 504) and a second data signal is received by a second detector at a second time, $t_2$ (block 506). The first data signal is the returning signal from the wellbore in response to the first acoustic signal generated by the first source. Likewise, the second data signal is the returning signal from the wellbore in response to the second acoustic signal generated by the second source. The method 500 further includes determining a difference between the first time and the second time (block 508).

If the first time is larger than the second time (i.e., $t_1-t_2>0$), then the second source is fired at a time after the firing of the first source. Specifically, under such conditions, the firing time of the first source can be determined according to the equation illustrated in block 510. Similarly, the firing time of the second source can be determined according to the equation illustrated in block 512.

If the first time is smaller than the second time (i.e., $t_1-t_2<0$), then the first source is fired at a time after the firing of the second source. Specifically, under such conditions, the firing time of the second source can be determined according to the equation illustrated in block 514. Similarly, the firing time of the first source can be determined according to the equation illustrated in block 516. However, if the first time and second time are the same (i.e., $t_1-t_2=0$), then the first and second sources are fired at the same time (block 518). The equations in blocks 510, 512, 514, and 516 are illustrative examples only which show one way in which the timing scheme of the sources can be determined.

In practice, the timing scheme can be determined in many other ways and with different mathematical algorithms. In particular, the timing scheme can be determined through applying algorithms that take into consideration other factors not explicitly illustrated herein for sake of brevity and so as not to cloud the inventive concept at hand. For example, in some embodiments, more than two sources may be present, and the timing scheme is determined by applying algorithms that accommodate the number of sources and which produce a timing scheme with the appropriate number of firing times. In some example embodiments, the method 600 may also include a step of adjusting the amplitude of the first and/or second acoustic signal generated by the first and/or second source based on the difference between $t_1$ and $t_2$ as determined at block 508.

In some other embodiments, the sources 204 can be fired at the same time and the acoustic data signals received by the detectors 206 from the wellbore can be time shifted accordingly, during post-processing, to compensate for the difference in distance from the respective source 204 to the wellbore 302.

Figure 6:
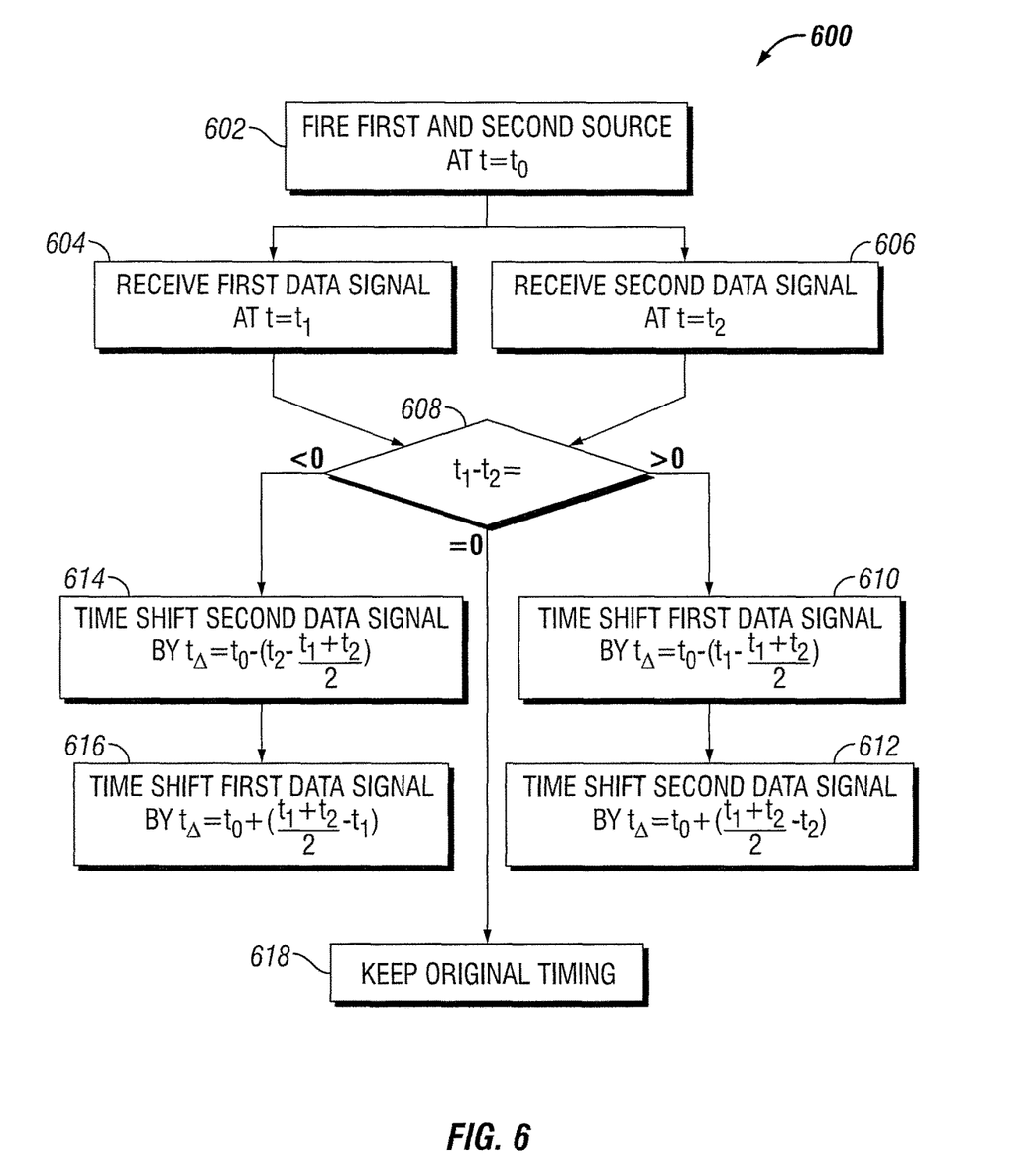
FIG. 6 illustrates a method of performing an acoustic logging operation through time shifting, in accordance with example embodiments of the present disclosure.

FIG. 6 illustrates a method 600 of performing an acoustic logging operation with time shifting, in accordance with example embodiments of the present disclosure. The method 600 includes firing a first source and a second source simultaneously at an initial time, $t_0$ (block 602). Then a first data signal is received by the first detector at a first time, $t_1$ (block 604) and a second data signal is received by a second detector at a second time, $t_2$ (block 606). The first data signal is the returning signal from the wellbore in response to the first acoustic signal generated by the first source. Likewise, the second data signal is the returning signal from the wellbore in response to the second acoustic signal generated by the second source. The method 600 further includes determining a difference between the first time and the second time (block 608).

If the first time is larger than the second time (i.e., $t_1 - t_2 > 0$), then the first data signal is time shifted backwards (i.e., leftward on a time scale increasing from left to right). Specifically, under such conditions, the time shift of the first data signal can be determined according to the equation illustrated in block 610. In some embodiments, the second data signal can also be time shifted forward. In certain such embodiments, the second data signal can be time shifted according to the equation illustrated in block 612. In some embodiments, and particularly embodiments wherein the acoustic sonde only has two sources, only one of the two data signals needs to be time shifted. Specifically, the first data signal can time shifted by the amount determined in block 610 minus the amount determined in block 612.

If the first time is smaller than the second time (i.e., $t_1 - t_2 < 0$), then the second data signal is time-shifted backwards (i.e., leftward on a time scale increasing from left to right). Specifically, under such conditions, the time shift of the second data signal can be determined according to the equation illustrated in block 614. In some embodiments, the first data signal is time shifted forward. In certain such embodiments, the first data signal can be time shifted according to the equation illustrated in block 616. In some embodiments, and particularly embodiments wherein the acoustic sonde only has two sources, only one of the two data signals needs to be time shifted. For example, the second data signal can time shifted by the amount determined in block 614 minus the amount determined in block 616.

However, if the first time and second time are the same (i.e., $t_1 - t_2 = 0$), then the original timing of the first and second data signals are kept (block 518). The equations in blocks 610, 612, 614, and 616 are illustrative examples only which show one way in which the data signal received can be time shifted to simulate a centered acoustic sonde. Other algorithms may be used in practice which fall within the scope of the present disclosure. The techniques of the present disclosure can be applied to monopole sources, dipole sources, quadripole sources, and the like. These techniques can also be applied to cases with more than two sources 204, with the algorithms of FIGS. 5 and 6 adapted accordingly as will be apparent to one skilled in the art.

Figure 7:
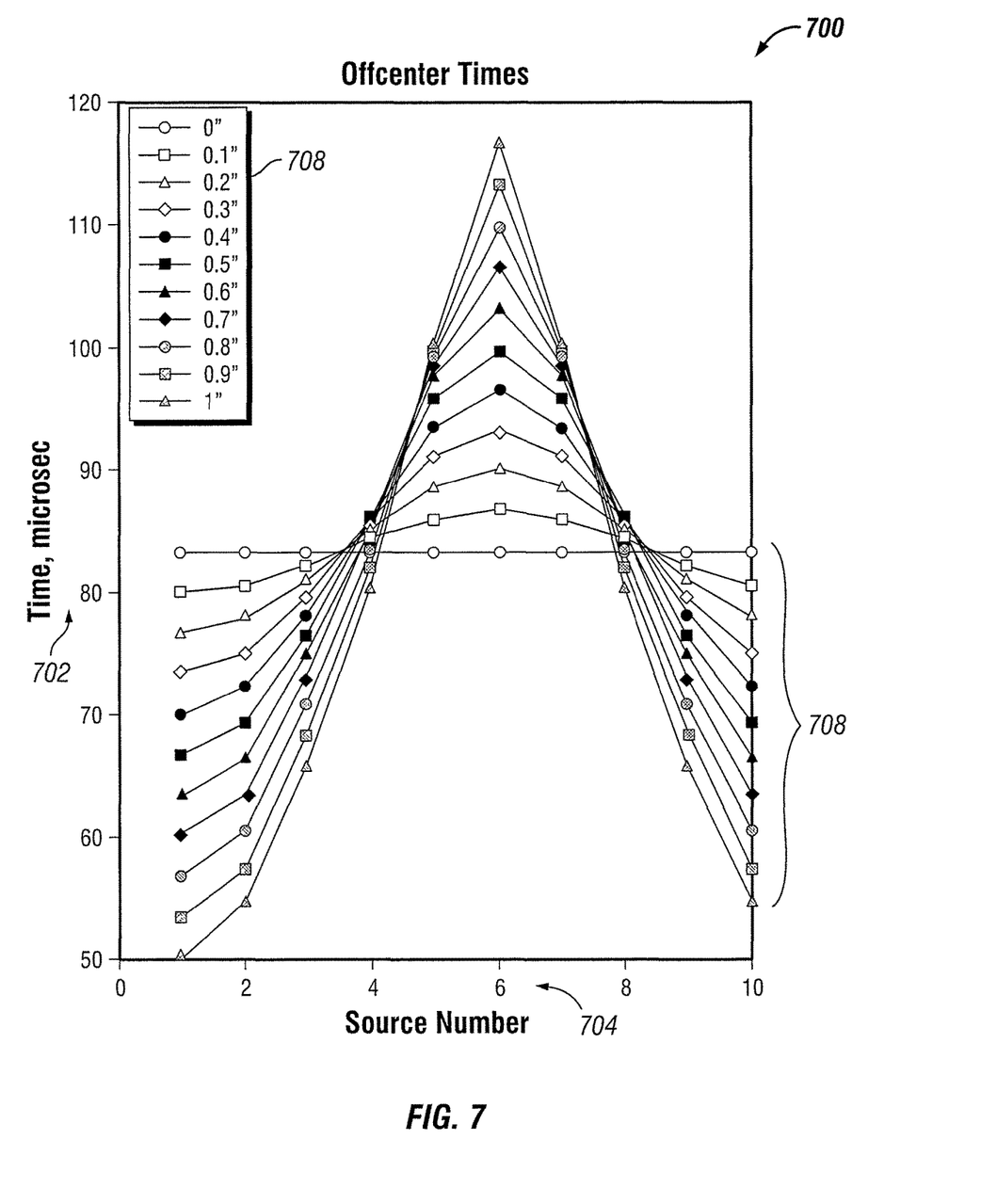
FIG. 7 is a graph of difference in signal arrival times between a plurality of sources, in accordance with example embodiments of the present disclosure.

Embodiments of the present disclosure can include sondes 200 with any number of sources 204 and the example timing schemes discussed herein any be extrapolated to suit operation of such a sonde 200. Specifically, each source 204 of the plurality of sources can be timed to fire at certain offsets apart such that the acoustic return signal of all the sources are detected by the receivers at the same time, thereby simulating a centered sonde 200. A method of generating a source firing time scheme for simulating a centered sonde 200 may include first conducting a test fire, in which all the sources 204 are fired at the same time and recording the amount of time it took for the respective acoustic return signals to be received at the sonde 200. FIG. 7 is a graph 700 which shows the expected approximate arrival times 702 of an acoustic signal reflected off the borehole wall measured by ten source elements 704 when all of the source elements are energized at the same time. The graph 700 illustrates this relationship for a plurality of distances by which the sonde is off-center 708.

Figure 8:
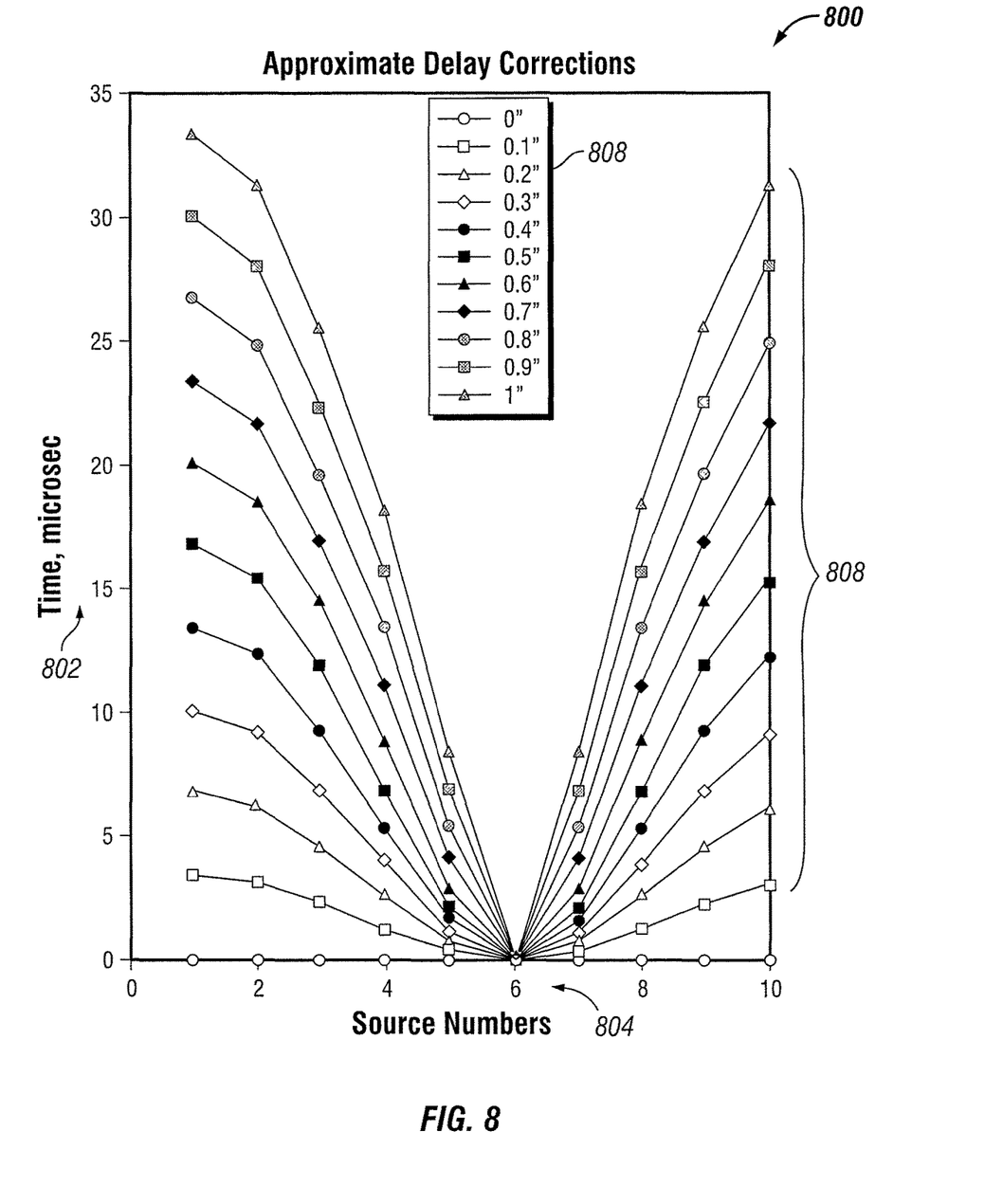
FIG. 8 is a graph of firing delays between a plurality of sources, as derived from the arrival times of FIG. 7, in accordance with example embodiments of the present disclosure.

A timing scheme is then constructed based on the difference in arrival times between the sources, in which firing delays corresponding to the difference in arrival time are added to the firing time of the sources, respectfully, compensating for differences in distance between the sources and the wellbore. Thus, the acoustic signals are received at all the sources at the same time. This can be easily adapted for any number of sources 204 as will be apparent to one skilled in the art. FIG. 8 shows approximate time delays 802 to be applied to the firing schedule of the sources 804 for a plurality of distances by which the sonde is off-center 808. In some embodiments, timing delays can be created by finding the longest arrival time amongst the sources as determined by the test fires, and determining the time delay for each source by subtracting its own arrival time from the longest arrival time.

In some embodiments, the inventive techniques provided herein, or at least a portion thereof, can be applied to acoustic logging operations in which the acoustic sonde 200 is centered within the wellbore 302, as illustrated in FIG. 3. In some application, it is desired for the acoustic sonde 200 to be off-center. An off-centered sonde simultaneously creates an entire series of wave types (modes) which are of increasingly higher order asymmetry. An off-center acoustic sonde 200 can be simulated by firing the sources 204 at different times such that the acoustic signals reach the wellbore walls at different times although the sonde 200 is physically located at the center of the wellbore 302.

In addition to the embodiments described above, many examples of specific combinations are within the scope of the disclosure, some of which are detailed below:

EXAMPLE 1

A method of performing acoustic logging, comprising:
generating a first test signal from a first acoustic source, wherein the first acoustic source is a first distance from a wellbore wall;
generating a second test signal from a second acoustic source, wherein the second acoustic source is a second distance from the wellbore wall;
receiving a first data signal associated with the first test signal at a first test time;
receiving a second data signal associated with the second test signal at a second test time; and determining a calibration value based on the first test time and the second test time.

EXAMPLE 2

The method of Example 1, wherein the first and second test signals are generated at the same time.

EXAMPLE 3

The method of Example 1, wherein the calibration value is a time delay or a time shift applied to the first data signal, the second data signal, or both.

EXAMPLE 4

The method of Example 3, further comprising:
generating a first acoustic signal from the first source at a first firing time; and
generating a second acoustic signal from the second source at a second firing time,
wherein the first firing time and the second firing time are set apart by the time delay.

EXAMPLE 5

The method of Example 4, wherein the first and second acoustic signals reach the wellbore wall at approximately the same time.

EXAMPLE 6

The method of Example 4, wherein the first distance is greater than the second distance and the first and second acoustic signals form a symmetric waveform.

EXAMPLE 7

The method of Example 4, wherein the first acoustic signal is generated before the second acoustic signal is generated when the first test time is larger than the second test time.

EXAMPLE 8

The method of Example 1, wherein the first source and second source are coupled to an acoustic sonde.

EXAMPLE 9

The method of Example 1, comprising:
adjusting an amplitude of the first acoustic signal, the second acoustic signal, or both based on the calibration factor.

EXAMPLE 10

The method of Example 8, wherein the first or second acoustic source form a monopole source or a dipole source.

EXAMPLE 11

A method of performing acoustic logging, comprising:
generating a first acoustic signal from a first source at a first time, wherein the first source is a first distance away from a wellbore wall; and
generating a second acoustic signal from a second source at a second time, wherein the second source is a second distance away from the wellbore wall,
wherein the difference between the first time and the second time depends on a calibration value.

EXAMPLE 12

The method of Example 11, wherein the compensation value is correlated with a difference between the first distance and the second distance.

EXAMPLE 13

The method of Example 11, wherein the first and second acoustic signals reach the formation at approximately the same time.

EXAMPLE 14

The method of Example 12, wherein the difference between the first time and the second time is zero when the difference between the first distance and the second distance is zero.

EXAMPLE 15

The method of Example 12, wherein the first source generates the first acoustic signal before the second source generates the second acoustic signal when the first distance is greater than the second distance.

EXAMPLE 16

The method of Example 12, wherein the first distance is greater than the second distance and the first and second acoustic signals form a symmetric waveform.

EXAMPLE 17

The method of Example 11, wherein the compensation value is correlated with a desired amount of simulated tool offset, wherein the first distance is equal to the second distance, and the first time is not equal to the second time.

EXAMPLE 18

A method of performing acoustic logging, comprising:
generating a first acoustic signal from a first source and generating a second acoustic signal from a second source simultaneously;
receiving a first data signal at a first time;
receiving a second data signal at a second time, wherein the second time is smaller than the first time;
determining a time shift based on the first time and the second time;
applying the time shift to the first data signal, the second data signal, or both.

EXAMPLE 19

The method of Example 18, wherein the first source and second source are coupled to an acoustic sonde.

EXAMPLE 20

The method of Example 18, wherein the first source is further from a wellbore wall than is the second source.

This discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

I claim:

1. A method of performing acoustic logging in a wellbore, comprising:
   generating a first test signal from a first acoustic source, wherein the first acoustic source is located in the wellbore at a first distance from a wall of the wellbore;
   generating a second test signal from a second acoustic source, wherein the second acoustic source is located in the wellbore at a second distance from the wall of the wellbore;
   receiving a first data signal associated with the first test signal at a first test time;
   receiving a second data signal associated with the second test signal at a second test time; and
   determining a calibration value based on a difference between the first test time and the second test time, wherein the calibration value comprises an offset for simulating that the first acoustic source and the second acoustic source are centered in the wellbore;
   generating a first acoustic signal from the first acoustic source at a first firing time;
   generating a second acoustic signal from the second acoustic source at a second firing time, wherein the first firing time and the second firing time are offset by the calibration value to simulate that the first acoustic source and the second acoustic source are centered in the wellbore.

2. The method of claim 1, wherein the first and second test signals are generated at the same time.

3. The method of claim 1, wherein the calibration value is time delay or a time shift applied to the first data signal, the second data signal, or both.

4. The method of claim 1, wherein the first and second acoustic signals reach the wellbore wall at the same time.

5. The method of claim 1, wherein the first distance is greater than the second distance.

6. The method of claim 1, wherein the first acoustic signal is generated before the second acoustic signal is generated when the first test time is larger than the second test time.

7. The method of claim 1, wherein determining the calibration value comprises subtracting the smaller of the first and second test times from the larger of the first and second test times.

8. The method of claim 1, comprising adjusting an amplitude of the first acoustic signal, the second acoustic signal, or both based on the calibration value.

9. The method of claim 1, wherein the first or second acoustic source form a monopole source or a dipole source.

10. A method of performing acoustic logging in a wellbore including a wellbore wall, comprising:
    generating a first acoustic signal from a first source within the wellbore at a first time, wherein the first source is a first distance away from the wellbore wall;
    generating a second acoustic signal from a second source within the wellbore at a second time, wherein the second source is a second distance away from the wellbore wall; and
    wherein the difference between the first time and the second time depends on a calibration value comprising an offset between the first acoustic signal and the second acoustic signal calibrated to simulate that the first source and the second source are centered in the wellbore.

11. The method of claim 10, wherein the calibration value is correlated with a difference between the first distance and the second distance.

12. The method of claim 10, wherein the first and second acoustic signals reach the formation at the same time.

13. The method of claim 11, wherein the difference between the first time and the second time is zero when the difference between the first distance and the second distance is zero.

14. The method of claim 11, wherein the first source generates the first acoustic signal before the second source generates the second acoustic signal when the first distance is greater than the second distance.

15. The method of claim 11, wherein the first distance is greater than the second distance.

16. The method of claim 10, wherein the calibration value is correlated with a desired amount of simulated tool offset, wherein the first distance is equal to the second distance, and the first time is not equal to the second time.

17. A method of performing acoustic logging within a wellbore, comprising:

generating a first acoustic signal from a first source within the wellbore and generating a second acoustic signal from a second source within the wellbore simultaneously;

receiving a first data signal associated with the first acoustic signal at a first time;

receiving a second data signal associated with the second acoustic signal at a second time, wherein the second time is smaller than the first time;

determining a time shift based on the first time and the second time; and applying the time shift to the first data signal, the second data signal, or both to simulate that the first source and the second source are centered in the wellbore.

18. The method of claim 17, wherein the first source and second source are coupled to an acoustic sonde.

19. The method of claim 17, wherein the first source is further from a wellbore wall within the wellbore than the second source.

20. An acoustic logging system, comprising:
a tool body;
a plurality of acoustic sources coupled to the tool body;
a plurality of detectors coupled to the tool body, each of the detectors corresponding to a unique acoustic source; and
a controller communicatively coupled to the acoustic source and the detector, wherein the controller controls activation of each of the acoustic sources individually according to a timing scheme, wherein the timing scheme comprises offsets for signals from the acoustic sources for simulating that the acoustic sources are centered in the wellbore.

21. The system of claim 20, wherein the timing scheme comprises relative time delays between activation of each of the acoustic sources.

22. The system of claim 20, wherein at least one of the acoustic sources is activated at a different time than the others, and all the detectors receive acoustics signals simultaneously.

23. The system of claim 20, wherein the plurality of acoustic sources form a monopole source or a dipole source.

* * * * *